(12) United States Patent
Guthmann

(10) Patent No.: US 7,215,598 B2
(45) Date of Patent: May 8, 2007

(54) IMAGING SONAR AND DETECTION SYSTEM USING SUCH A SONAR

(75) Inventor: Pierre Guthmann, Brest (FR)

(73) Assignee: Thales, Neuilly Sur Seine (FR)

( * ) Notice: Subject to any disclaimer, the term of this patent is extended or adjusted under 35 U.S.C. 154(b) by 119 days.

(21) Appl. No.: 10/483,184

(22) PCT Filed: Jul. 5, 2002

(86) PCT No.: PCT/FR02/02369

§ 371 (c)(1),
(2), (4) Date: Jun. 10, 2004

(87) PCT Pub. No.: WO03/008998

PCT Pub. Date: Jan. 30, 2003

(65) Prior Publication Data

US 2004/0208084 A1   Oct. 21, 2004

(30) Foreign Application Priority Data

Jul. 13, 2001   (FR) .................................. 01 09405

(51) Int. Cl.
*G01S 15/89* (2006.01)
(52) U.S. Cl. ...................................................... 367/88
(58) Field of Classification Search .................. 367/88, 367/7, 11
See application file for complete search history.

(56) References Cited

U.S. PATENT DOCUMENTS

| | | | |
|---|---|---|---|
| 4,493,064 A | 1/1985 | Odero et al. | |
| 5,287,330 A | 2/1994 | Gilmore | |
| 6,160,756 A | 12/2000 | Guigne | |
| 6,285,628 B1 * | 9/2001 | Kiesel | 367/138 |
| 2002/0126577 A1 * | 9/2002 | Borchardt | 367/88 |
| 2004/0208084 A1 * | 10/2004 | Guthmann | 367/88 |

FOREIGN PATENT DOCUMENTS

| | | |
|---|---|---|
| EP | 10 85 497 A | 3/2001 |
| FR | 2 509 869 A | 1/1983 |

OTHER PUBLICATIONS

JAFFE; "Sensors for Underwater Robot Vision: Status and Prospect"; Proceedings of the International Conference on Robotics and Automation Sacramento, Apr. 9-11, 1991, Los Alamit s, IEEE Comp. Soc. Press, US, vol. 2, Conf. 7 (Apr. 9, 1991), pp. 2759-2766, XP010024147.

* cited by examiner

*Primary Examiner*—Dan Pihulic
(74) *Attorney, Agent, or Firm*—Lowe Hauptman & Berner, LLP

(57) ABSTRACT

The disclosure relates to an imaging sonar for detection of objects buried in a reflecting medium, comprising a "vertical" transmit antenna and a horizontal receive antenna forming a "Mills Cross", said transmission means enabling a vertical radiation angle producing a slightly ensonified area thereby reducing masking of the echo from said buried objects by acoustic backscatter from said reflecting medium. The invention is applicable to sonars and "sonar towfish" used for seafloor imaging and enables detection of sub-bottom objects buried in submarine sediments.

26 Claims, 2 Drawing Sheets

IMAGING SONAR AND DETECTION SYSTEM USING SUCH A SONAR

BACKGROUND OF THE INVENTION

The invention relates to high-definition sonars used for submarine imaging. It concerns in particular sonar means enabling identification of objects buried in sedimentary layers. It also concerns detection systems using such a sonar mounted on a self-propelled submarine vehicle.

In this field there are known techniques consisting in towing a "sonar towfish" equipped with sonar means operating in parametric mode, in other words transmitting at two high frequencies, typically about one hundred kHz, and receiving at the lower beat frequency. This technique is described for example in the French patent no. 2 509 869 filed on 17 Jul. 1981 by the company SINTRA-ALCATEL under the number 81 213 961.

This technique has a major disadvantage associated with the parametric mode, which is a transmission loss of about 30 to 40 dB.

In the U.S. Pat. No. 6,160,756 filed on 15 Jun. 1998 by GUIGNE International Ltd and published on 12 Dec. 2000, a system for seafloor imaging is described employing a sonar also operating in parametric mode and designed to move slowly near the seabed ensonifying it vertically. The antenna is notably mounted on a tracked vehicle that moves across the seabed. This technique has the disadvantages of having a small intercept and requiring a large number of transducers, the antenna being flat-mounted (2 dimensional).

SUMMARY OF THE INVENTION

To overcome these disadvantages, the invention proposes an imaging sonar for detection of objects buried in a reflecting medium, comprising a "vertical" transmit antenna and a horizontal receive antenna forming a "Mills Cross", said transmission means enabling a vertical radiation angle producing a slightly ensonified area thereby reducing masking of the echo from said buried objects by acoustic backscatter from said reflecting medium.

According to another characteristic of the invention, signals are received at the transmission frequency.

According to another characteristic of the invention, the transmission signals from the transmit antenna are weighted in phase and amplitude to obtain said slightly ensonified area.

According to another characteristic of the invention, the transducers forming the transmit antenna are grouped to form macrosensors to obtain said slightly ensonified area.

According to another characteristic of the invention, it includes means for making programmable the elevation angle of the transmit and receive beams.

According to another characteristic of the invention, the transmit antenna includes at least 3 facets to obtain a wide intercept.

According to another characteristic of the invention, the transmission frequency is between 100 and 200 kHz.

According to another characteristic of the invention, it is adapted for seafloor imaging and the absorbent medium is submarine sediment.

According to another characteristic of the invention, it can operate in two different modes according to the nature of the seabed.

The invention also proposes a seafloor imaging system which is mounted on the front of a self-propelled vehicle and in which the angle of elevation of the plane of the two antennas is variable to enable it to be adapted to the nature of the sediments encountered.

BRIEF DESCRIPTION OF THE DRAWINGS

The invention will be better understood and its other particularities and advantages will become clear on reading the detailed description below of an embodiment, which is non-limitative and taken only as an example, with reference to the attached drawings of which.

MORE DETAILED DESCRIPTION

Figure 1:
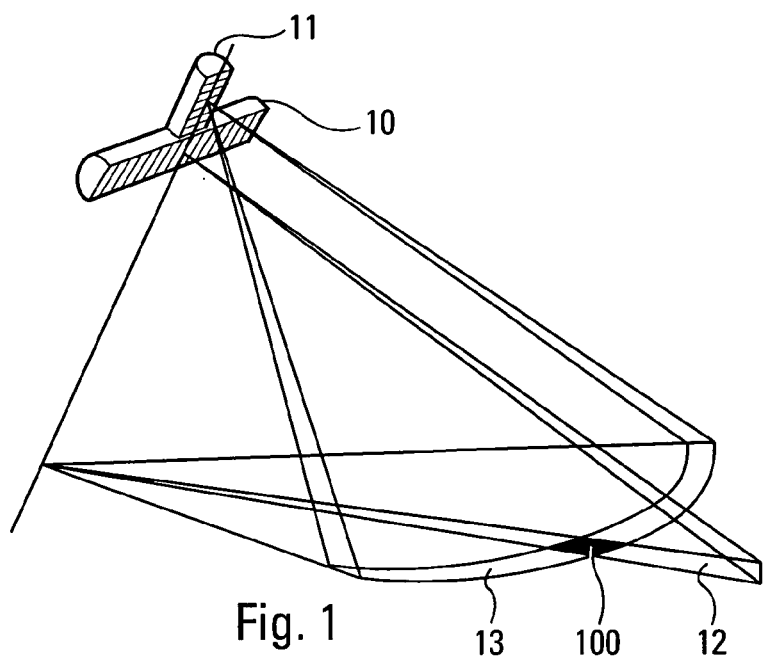
FIG. 1 shows a perspective view of the antenna system and the associated radiation beams.

The antenna system shown in FIG. 1 includes a horizontal receive antenna 10 and a vertical transmit antenna 11 (off-vertical in fact since it is inclined relative to the vertical). Each antenna includes transducers of same type enabling transmission and reception over a broad frequency band of several tens of kilohertz. Such a transducer is described for example in the patent no. 2 722 355 filed by the company THOMSON-CSF on 8th Jul. 1994 under the number 94 08 474.

This assembly forms a so-called "Mills Cross" which determines, for a given direction, an observation spot 100 at the intersection of the transmit beam 13 and the receive beam 12.

The plane formed by the two antennas is inclined relative to the vertical to enable it to ensonify the seabed obliquely.

Figure 2:
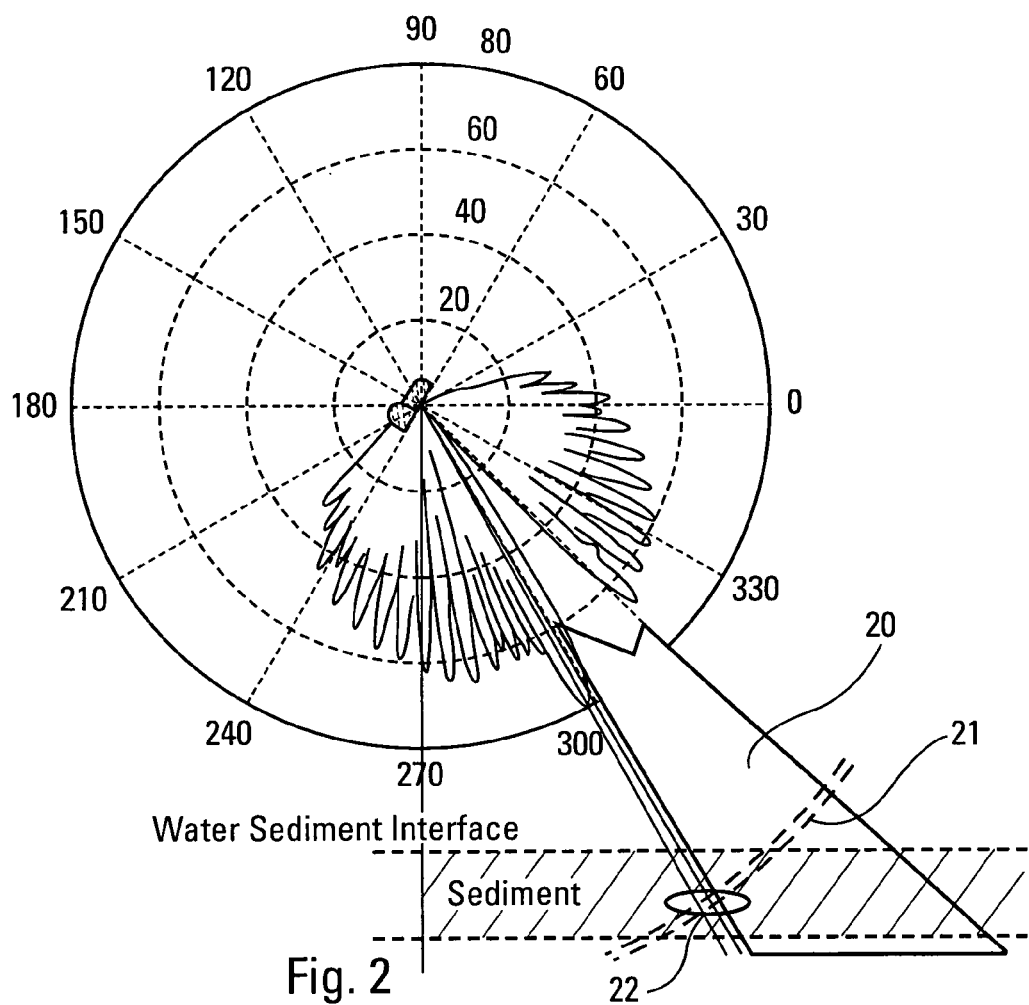
FIG. 2 shows a radiation diagram of the transmit antenna.

According to an essential characteristic of the invention, in the transmit beam 12 an inclined beam is formed whose directivity ensures a slightly ensonified area. In the radiation diagram of the beam 12 represented in FIG. 2, this area is labelled 20. The emitted pulse 21 is seen arriving at the level of the buried object 22. The echo from the water/sediment interface arrives at the same instant as the one from the object, producing a masking effect which is a serious problem in the absence of the slightly ensonified area 20. The sedimentary layers between the object and this interface also contribute to this asking. The area 20 greatly attenuates this masking.

The invention achieves this small area 20 by creating a "zero" in the direction of the seabed echo by making the vertical directivity asymmetric and making the direction of the beam dirigible.

In one embodiment of the invention, given as an example, the vertical transmit antenna is constituted by 48 transducers spaced at λ/2 from the central transmission frequency of 150 kHz, or 5 mm. The antenna comprises 2 modules each containing 24 transducers.

In a preferred embodiment of the invention, the signals of the transmitters (amplifiers) are weighted in amplitude and in phase. In one embodiment the values of the amplitude and phase weightings are given by the following table:

| Transmitter number | Amplitude | Phase (°) |
|---|---|---|
| 1 | 0.65 | −167.5 |
| 2 | 0.25 | −59.2 |
| 3 | 0.47 | −51.4 |
| 4 | 0.422 | −64.4 |
| 5 | 0.281 | −73.8 |

-continued

| Transmitter number | Amplitude | Phase (°) |
|---|---|---|
| 6 | 0.18 | −55.8 |
| 7 | 0.245 | −25.9 |
| 8 | 0.369 | −24.3 |
| 9 | 0.44 | −31.2 |
| 10 | 0.432 | −38.5 |
| 11 | 0.372 | −41.8 |
| 12 | 0.319 | −35.8 |
| 13 | 0.34− | −23 |
| 14 | 0.432 | −16.4 |
| 15 | 0.535 | −16.8 |
| 16 | 0.589 | −19.8 |
| 17 | 0.574 | −22.3 |
| 18 | 0.508 | −22.3 |
| 19 | 0.446 | −17.6 |
| 20 | 0.448 | −9.8 |
| 21 | 0.539 | −4.7 |
| 22 | 0.691 | −3.6 |
| 23 | 0.862 | −4 |
| 24 | 1 | −3.7 |
| 25 | 0 | 0 |
| 26 | 0 | 0 |
| 27 | 0.985 | 1.8 |
| 28 | 0.853 | 3.4 |
| 29 | 0.699 | 4.4 |
| 30 | 0.561 | 5.5 |
| 31 | 0.472 | 8.8 |
| 32 | 0.454 | 14.8 |
| 33 | 0.498 | 20.2 |
| 34 | 0.560 | 22 |
| 35 | 0.588 | 20.8 |
| 36 | 0.552 | 18.2 |
| 37 | 0.462 | 16.4 |
| 38 | 0.362 | 19.6 |
| 39 | 0.315 | 30.7 |
| 40 | 0.352 | 40.4 |
| 41 | 0.423 | 40.2 |
| 42 | 0.456 | 34.1 |
| 43 | 0.408 | 26.1 |
| 44 | 0.282 | 21.6 |
| 45 | 0.160 | 41.1 |
| 46 | 0.220 | 76.7 |
| 47 | 0.394 | 69 |
| 48 | 0.548 | 50.8 |
| 49 | 0.509 | 32.9 |
| 50 | 0.904 | 168.7 |

Only one beam is formed at each transmission, but its direction can be modified electronically in a known manner, for example by ±20° around the nominal direction. In a variant embodiment, a "zero" is created in a given direction by forming macrosensors without weighting the transmitter signals. For example, to obtain a zero in the direction 14.5°, we group the transducers by 8, which forms the first zeros of the macrosensors' directivity at ±14.5° for d=λ/2. The directivity of the macrosensors thereby weights the antenna directivity, producing a slightly ensonified area.

Figure 3:
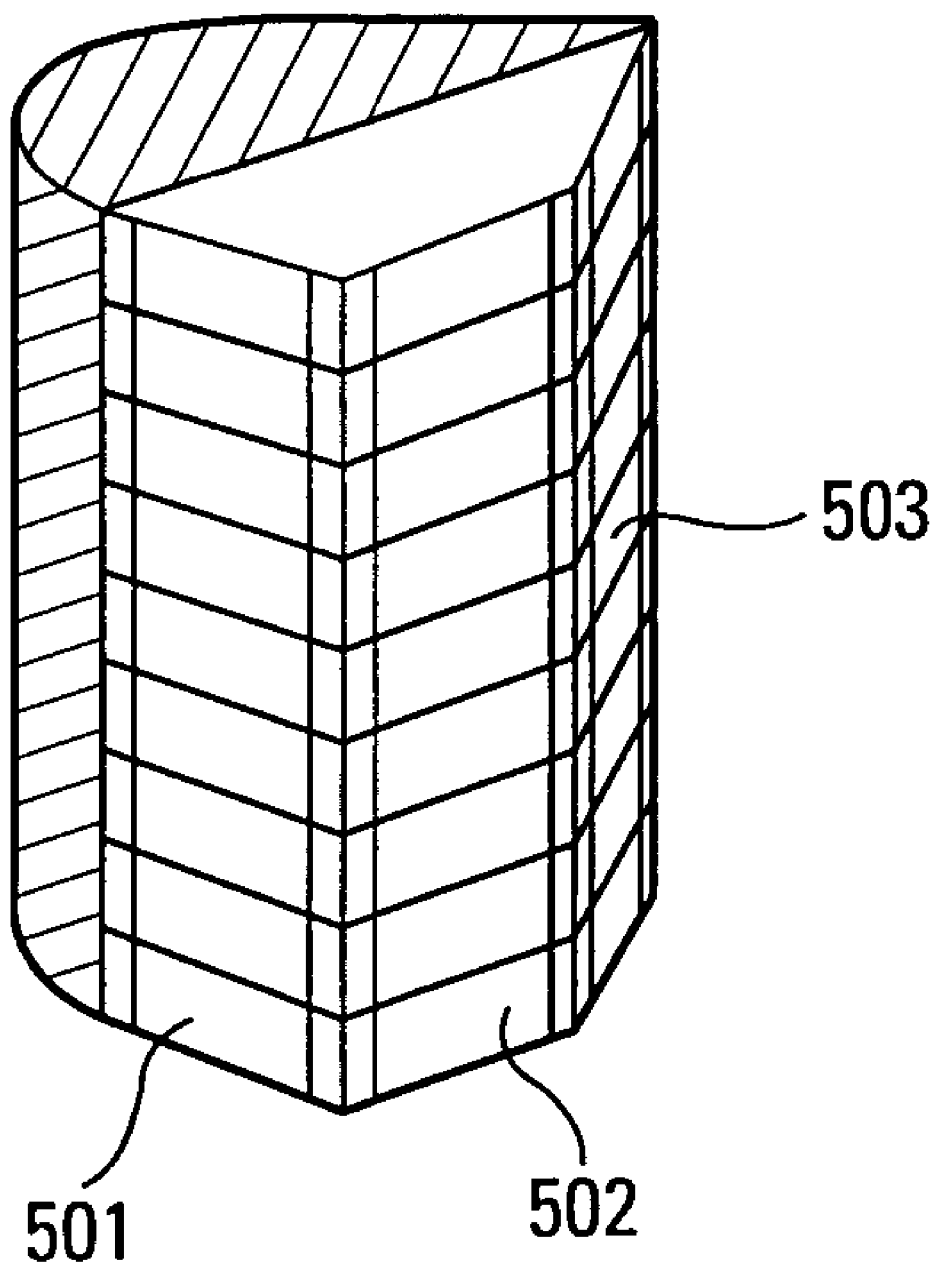
FIG. 3 shows an embodiment of the transmit antenna.

In a preferred embodiment, the transmit antenna comprises 3 facets, as shown in FIG. 3. In this manner, according to the invention two operating modes are possible:

a low altitude mode with a narrow intercept, a higher altitude mode with a wide intercept.

In the narrow intercept mode, the transmission is made only from the central facet 502 which reduces the ensonified field and therefore the backscatter. With the values of the embodiment shown above, a 20° field is obtained with a width of about I=30 mm. This mode is used with seabeds formed from sediments assumed to be strongly reflecting (sand for example). In this case the elevation angle of the transmission beam is about 70°, in other words with a high incidence angle, in order to facilitate penetration into the sediments. Transmission and reception are alternate, the transmission n+1 being made at the end of the reception n.

In the wide intercept mode, all three facets 501, 502, 503 transmit to cover a horizontal field of 60°. Three successive transmissions are made before the arrival of the first reception signals. With this mode, which is used with less reflecting seabeds (mud for example), the transmitted beam has an elevation angle of about 40°.

A detection system applying the invention includes a self-propelled vehicle equipped with a frontal sonar whose antennas are as shown in FIG. 1. The plane of the two antennas 10 and 11 is inclined at 20° or at 50° relative to the vertical, depending on the mode used.

In one embodiment, in narrow intercept mode, the vehicle moves at a speed of 4 knots at about 4 metres from the seabed. The transmit recurrence duration is about 10 ms, or n=25 successive transmissions for a target of 50 cm length in the direction of movement. By integration at each recurrence the signal-to-noise ratio can be improved by about 8 to 9 dB in the case of a gain in $\sqrt{n}$. The low altitude, made possible by the use of an autonomous vehicle, reduces propagation losses (divergence and absorption). For example, a gain of around 20 dB is achieved by reducing the altitude from 15 m to 4 m. In this example the ensonification swath is about 1 hectare per hour.

In wide intercept mode, the vehicle moves at an altitude of 15 m at the same speed of 4 knots, in which case the swath of the system is about 1 hectare per hour.

On "difficult" terrain it may of course by advantageous to operate in wide intercept mode and reduce the speed of advance, since the constraints of navigation precision are less.

The cross-type configuration of the antennas can be inverted (the vertical antenna pointing downwards) while remaining within the scope of the invention.

The invention claimed is:

1. An imaging sonar for detection of objects buried in a reflecting medium, comprising:
   a vertical transmit antenna,
   a horizontal receive antenna and transmission means, wherein said transmit and receive antennas form a cross and are arranged to insonify the seabed obliquely, said transmission means forming a transmission patern having an elevation angular sector producing a slight ensonification. said transmission pattern thereby reducing masking of the echo from the buried objects by acoustic backscatter from the reflecting medium.

2. The imaging sonar according to claim 1, wherein reception of sonar is carried out at the transmission frequency.

3. The imaging sonar according to claim 1, wherein the transmission signals of the transmit antenna of said sonar are weighted in phase and amplitude in such a way as to obtain said slightly ensonified area.

4. The imaging sonar according to claim 2, wherein the transmission signals of the transmit antenna of said sonar are weighted in phase and amplitude in such a way as to obtain said slightly ensonified area.

5. The imaging sonar according to claim 1, comprising transducers forming the transmit antenna, said transducers being grouped to form macrosensors in such a way as to obtain said slightly ensonified area.

6. The imaging sonar according to claim 2, comprising transducers forming the transmit antenna, said transducers being grouped to form macrosensors in such a way as to obtain said slightly ensonifled area.

7. The imaging sonar according to claim 3, comprising means for making programmable the elevation angle of the transmit and receive beams.

8. The imaging sonar according to claim 4, comprising means for making programmable the elevation angle of the transmit and receive beams.

9. The imaging sonar, according to claim 3, wherein the transmit antenna includes at least 3 facets to obtain a wide intercept.

10. The imaging sonar, according to claim 4, wherein the transmit antenna includes at least 3 facets to obtain a wide intercept.

11. The imaging sonar, according to claim 7, wherein the transmit antenna includes at least 3 facets to obtain a wide intercept.

12. The imaging sonar, according to claim 8, wherein the transmit antenna includes at least 3 facets to obtain a wide intercept.

13. The imaging sonar, according to claim 3, wherein the transmission frequency is between 100 and 200 kHz.

14. The imaging sonar, according to claim 4, wherein the transmission frequency is between 100 and 200 kHz.

15. The imaging sonar, according to claim 7, wherein the transmission frequency is between 100 and 200 kHz.

16. The imaging sonar, according to claim 8, wherein the transmission frequency is between 100 and 200 kHz.

17. The imaging sonar, according to claim 9, wherein the transmission frequency is between 100 and 200 kHz.

18. The imaging sonar, according. to claim 10, wherein the transmission frequency is between 100 and200 kHz.

19. The imaging sonar, according to claim 11, wherein the transmission frequency is between 100 and 200 kHz.

20. The imaging sonar, according to claim 12, wherein the transmission frequency is between 100 and 200 kHz.

21. The imaging sonar according to claim 3, adapted for seafloor imaging, notably when an absorbent medium is submarine sediment.

22. The imaging sonar according to claim 4, adapted for seafloor imaging, notably when an absorbent medium is submarine sediment.

23. The imaging sonar according to claim 3, comprising a transmit antenna with 3 facets and able to operate in either of the two following modes:
   a low altitude mode with narrow intercept,
   a higher altitude mode with a wide intercept according to the nature of the seafloor.

24. The imaging sonar according to claim 4, comprising a transmit antenna with 3 facets and able to operate in either two of the following modes
   a low altitude mode with narrow intercept
   a higher altitude mode with a wide intercept according to the nature of the seafloor.

25. A seafloor imaging system, comprising a sonar according to claim 3 which is mounted on the front of a self-propelled vehicle and in which the angle of elevation of the plane of said transmit and receive antennas is variable to enable it to adapt to the nature of sediments encountered, said sediments constituting the seabeds.

26. A seafloor imaging system, comprising a sonar according to claim 4 which is mounted on the front of a self-propelled vehicle and in which the angle of elevation of the plane of said transmit and receive antennas is variable to enable it to adapt to the nature of sediments encountered, said sediments constituting the seabeds.

* * * * *